United States Patent [19]
Darmon et al.

[11] Patent Number: 5,483,545
[45] Date of Patent: Jan. 9, 1996

[54] METHOD OF AUTOMATICALLY REQUESTING RETRANSMISSION IN A DUPLEX DIGITAL TRANSMISSION SYSTEM HAVING AT LEAST ONE NOISY RETURN CHANNEL, AND AN INSTALLATION FOR IMPLEMENTING THE METHOD

[75] Inventors: Marc Darmon, Paris; Marc Pontif, Villennes Sur Seine; Philippe Sadot, Paris, all of France

[73] Assignee: Alcatel Transmission Par Faisceaux Hertziens A.T.F.H., Evallois Perret Cedex, France

[21] Appl. No.: 946,795

[22] Filed: Sep. 18, 1992

Related U.S. Application Data

[63] Continuation of Ser. No. 607,336, Oct. 30, 1990, abandoned.

[30]    Foreign Application Priority Data

Nov. 28, 1989 [FR]  France ................... 89 15631

[51] Int. Cl.[6] .................................................. H04L 1/16
[52] U.S. Cl. ...................................................... 371/32
[58] Field of Search .......................................... 371/32, 33

[56]          References Cited

U.S. PATENT DOCUMENTS 4,368,512  1/1983  Kyu et al. .................... 395/325

FOREIGN PATENT DOCUMENTS 0193091  9/1986  European Pat. Off. .

OTHER PUBLICATIONS

Weissberger, A., "Bit Oriented Data Link Controls", *Computer Design*, Mar. 1983, pp. 195–206.

Magill, J., et al., "Fast data–comm controller speaks to all protocols over two sets of channels", Electronic Design, Jan. 24, 1985, pp. 157–168.

Easton, M., "Batch Throughput Efficiency of ADCCP/HDLC/SDLC Selective Reject Protocols", *IEEE Transactions on Communications*, vol. COM–28, No. 2, Feb. 1980, pp. 187–195.

Lin, S. et al., "Automatic Repeat Request Error Control Schemes" *IEEE Communications Magazine*, Dec. 1984, vol. 22, No. 12, pp. 5–17.

IEEE Global Telecommunications Conference, Tokyo, Nov. 15–18, 1987, pp. 2100–2104, IEEE, New York, USA; M. Nakamura et al.: "ARQ scheme reinforced with past acknowledgement signals".

N. T. Z.–ARCHIV, vol. 6, No. 7, Jul. 1984, pp. 151–158, Berlin, Germany; H. D. Clausen et al.: "HDLC und ahnliche Leitungskontrollverfahren fur Satellitenkanale".

Primary Examiner—Stephen M. Baker
Attorney, Agent, or Firm—Sughrue, Mion, Zinn, Macpeak & Seas

[57]              ABSTRACT

A go-back-N automatic repeat request method for use on a duplex installation having noisy return channels. When an acknowledge signal (ACK) is not correctly received, it is assumed to be positive until the Nth successive incorrectly received acknowledgement, which is treated as a negative acknowledgement, thereby ensuring that blocks are repeated even if acknowledgements are degraded by jamming.

6 Claims, 1 Drawing Sheet

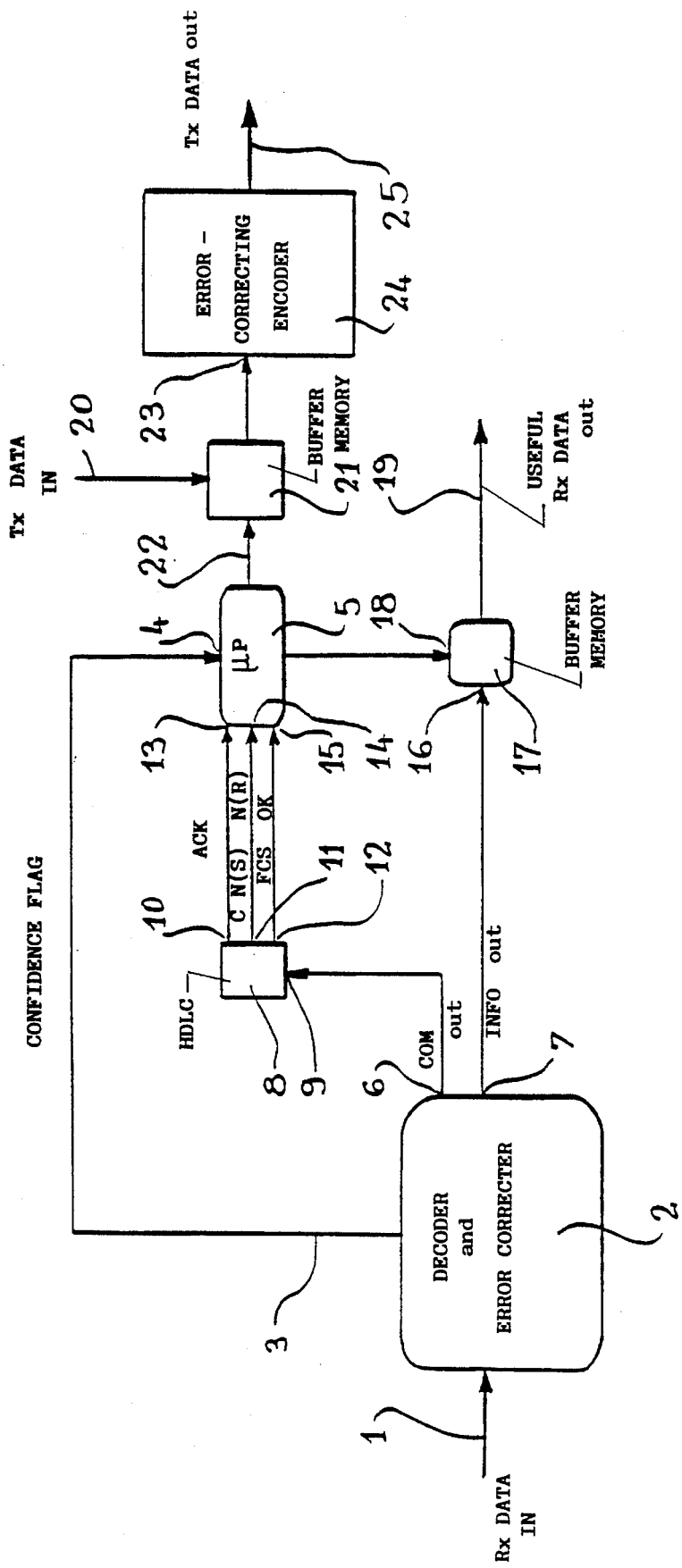

METHOD OF AUTOMATICALLY REQUESTING RETRANSMISSION IN A DUPLEX DIGITAL TRANSMISSION SYSTEM HAVING AT LEAST ONE NOISY RETURN CHANNEL, AND AN INSTALLATION FOR IMPLEMENTING THE METHOD

This is a Continuation of application Ser. No. 07/607,336 filed Oct. 30, 1990, now abandoned.

BACKGROUND OF THE INVENTION

1. Field of the Invention

The present invention relates to a method of automatically requesting retransmission in the event of a message being badly received, otherwise known as an "ARQ method", for a duplex digital data transmission installation having at least one noisy return channel, and also to an installation enabling the method to be implemented.

2. Description of the Related Art

Three strategies are in general use for reducing the error rare of a digital transmission.

The first strategy consists in using an error-correcting code without a return channel (known as "forward error control" or "FEC"). A drawback of this error correction strategy is its poor adaptability which can be a handicap with certain types of channel (a tropospheric channel or a channel suffering jamming). For example, with a tropospheric channel, various channel parameters such as mean signal-to-noise ratio, coherence band or coherence time remain fixed only on a small scale. If these parameters are observed over several hours, several days, or several months, it is observed that they are subject to non-negligible fluctuations. Thus, a code designed to function ideally with given parameters will probably be ineffective at certain times of the day or of the year. Although this strategy does have the advantage of ensuring a transmission delay which is constant, it is ineffective against bursts of errors unless it is associated with interlacing, which has the drawback of increasing transmission delay.

A second strategy is to make use of a return path, by using the ARQ ("Automatic Repeat request") strategy where errors are detected and retransmission is requested. This strategy may be defined as follows:

data is sent in packets, rather than continuously;

each packet contains information symbols accompanied by check symbols; and the receiver makes use of the check symbols to detect errors in transmission, if any. Depending on the result of the check, the receiver either accepts a block or else requests retransmission.

The ARQ strategy thus makes use of an error-detecting code, whereas the FEC strategy makes use of an error-correcting code. As a general rule, the decoding required for error-detecting codes is simpler than that required for error-correcting codes.

This strategy gives rise to additional redundancy in the form of retransmission. Thus although the redundancy specific to the encoding is constant (and given by the code ratio), the amount of additional redundancy is a random variable. The total mean redundancy is given by the effective code ratio. The main drawback of this strategy is that when transmission conditions are bad (very noisy channel), the error-detecting code is quickly submerged and the number of repeats becomes very large, thereby increasing transmission delay.

The third strategy currently in use seeks to mitigate this problem by associating the ARQ strategy with an error-correcting code.

This third strategy is referred to as a "hybrid" strategy since it combines error-correcting code with an ARQ procedure. The code used serves not only to detect errors, but also to correct them within the limit of its capability. The strategy is thus as follows:

the receiver has a decoder which attempts to decode the sequence as received, and a specific criterion is used representative of the confidence that may be had in the decision of the decoder; and if the criterion is satisfied, then the decoded sequence is accepted as being the same as the sequence that was transmitted, otherwise a request is made for retransmission.

Both the second strategy and the third strategy require retransmission to be requested. The three most conventional schemes currently in use are as follows:

The simplest scheme is "stop-and-wait" ARQ. The transmitter sends a block and then before sending the next block it waits for the receiver to acknowledge that it has received the transmitted block correctly. The main drawback of these scheme is that too much time is spent waiting for a positive or negative acknowledgement.

The second scheme is "go-back-N" ARQ and is both more complex and more efficient. Packets of symbols are transmitted on a continuous basis. Replies from the receiver arrive after a certain time delay equal to the time during which the transmitter sends a further N–1 packets. If the transmitter receives a request for retransmission (corresponding to an error in a packet), then it retransmits not only the erroneous packet, but also all the following packets. This system is well adapted to certain channels having memory where a first erroneous packet is very often followed by other packets suffering from noise. This applies to a high data rate tropospheric scatter channel.

The third scheme is the most complex but also the most efficient. It is called "selective-repeat" ARQ. As in the preceding scheme, blocks are sent on a continuous basis, and only erroneous blocks are retransmitted. The receiver must therefore be fitted with a large buffer memory to be able to reproduce the blocks in order. This is the most difficult ARQ protocol to implement.

In all of the technical literature published so far and of which we are aware, performance calculations relating to the various ARQ strategies and schemes always assume that the return channel is noise-free. A repeat request requires only a few bits at most and it can therefore be encoded in a manner that is very effective, using enormous redundancy to be sure that the request is properly received. However, such a method is not applicable when there is high rate data flow in both directions, e.g. in a duplex digital telephone installation. If the return channel is to be used for improving the quality of a link, there can be no question of significantly increasing its data rate. Only a small amount of space can be allocated to frame management, and it must be assumed that the return channel is noisy, which necessarily degrades performance since the transmitter may fail to receive a positive or negative acknowledgement from the receiver, either because the return channel is noisy on a random and non-intentional basis (as applies to a troposphere channel), or else, and above all, because the return channel is being jammed intentionally by an intelligent jammer.

SUMMARY OF THE INVENTION

The invention seeks to remedy the drawbacks of the conventional techniques.

To this end, the present invention provides a method of automatically requesting retransmission of a badly received message, for use in a duplex digital transmission installation having at least one return channel, the method making use of a go-back-N ARQ type protocol, i.e. an automatic repeat request protocol in which packets of symbols are transmitted on a continuous basis, and responses from the receiver arrive after a certain time delay equal to the time taken by the transmitter to transmit (N−1) other packets. The protocol is based on the conventional go-back-N ARQ rules together with at least the following additional rule:

when an acknowledgement is not received correctly, after a preceding acknowledgement that was received correctly, then the incorrectly received acknowledgement is assumed to be positive, as are the (N−1) following acknowledgements if they too are received incorrectly, but under such circumstances, if the Nth acknowledgement is still incorrectly received, it is assumed to be negative so that the N blocks relating to this series of N incorrectly received acknowledgements are then repeated.

Advantageously, this protocol includes the following two additional rules:

when the receiver receives a repeat request, it does not take it into account if the requested block has been requested less than N turns previously; and when the receiver requests the same block several times in succession up to N times, only the first request is taken into account.

BRIEF DESCRIPTION OF THE DRAWINGS

The invention and its advantages and other characteristics will be well understood on reading the following description of an embodiment applicable to an installation providing a duplex digital telephone link via a radio beam, with reference being made to the sole accompanying figure which is a block diagram of a portion of the installation for one of two parties.

This sole FIGURE relates to that portion of a duplex telephone transmitter/receiver installation which is concerned with digital signal processing.

DETAILED DESCRIPTION OF THE PREFERRED EMBODIMENTS

In the FIGURE, reference 1 designates an inlet wire on which a digital data train is received from the other party via a radio link.

This digital data train is encoded using an error-correcting code, and it is consequently applied to an error decoder-correcter 2. In this example, a convolution code is used having a code ratio of ½ for example, and having a constraint length of 35, provided by means of sequential decoding using the stack algorithm. The decoder 2 is thus a sequential decoder which has the known advantage of it being easy to provide a flag signal on one of its three outputs 3 representative of the decoding reliability, i.e. a "confidence flag" (which is constituted in this case by a flag indicating whether or not the stack has overflowed). Depending on the value of this confidence flag, either decoding is judged to be effective, in which case there is no need to request a repeat, or else the decoding is judged to be ineffective, in which case it is necessary to request a repeat.

Each frame received at 1 is therefore an encoded frame with the encoding being performed in the installation of the other party who sent the message that is received at 1. The other party's installation is similar to that shown in the drawing.

Prior to encoding, the frame is constituted as follows:

| MVT | COM | INFO |
|-----|-----|------|

It therefore comprises:

An entirely conventional frame locking word MVT provided for packet synchronization purposes. This frame locking word is not encoded by the sequential encoder.

A command block COM which contains all of the information required for the automatic repeat request protocol, and in particular: a positive or negative acknowledgement (ACK=1 or ACK=0), the number N(S) of the block transmitted in the frame, the number N(R) of the expected block (or the block whose repeat is being requested), error-correcting or error-detecting code FCS relating to the block COM, and a FLAGS word constituting the frame locking word for the block COM.

An information block INFO contains the information bits per se.

The data train applied at 1 comprises the encoded bits that occur between frame locking words MVT. The confidence flag output from the sequential decoder 2 on its output 3 is applied to input 4 of a controlling microprocessor 5, whereas decode outputs 6 and 7 of the decoder 2 respectively deliver the bits corresponding to decoded block COM and the bits corresponding to decoding block INFO.

An interface component which is very practical and cheap is referred to as an "HDLC" component. This electronic component is widely available on the market and it serves, when a digital frame is to its sole input in a certain particular format, to output various components of the frame directly on each of its multiple outputs, which components include, in particular, a reliability flag.

The format of a block in a HDLC frame is as follows:

| FLAGS | ADDRESS | CONTROL | INFO-COM | FCS |
|-------|---------|---------|----------|-----|

In HDLC protocol, the FLAGS word is a frame locking word for the HDLC frame. The ADDRESS field serves to specify the destination of the information in the INFO-COM field. The CONTROL field (8 bits) serves to control the HDLC frame. The FCS word is constituted by an error-detecting (or error-correcting) code word.

In order to make it possible to use an HDLC component 8 because it is so convenient and cheap, the 24 bits of the three fields ADDRESS, CONTROL, and INFO-COM in a conventional HDLC frame are used as follows in the above-mentioned block COM output at 6:

the acknowledgement bit ACK is the first bit in the ADDRESS field; and the other items in the block COM (other than its frame locking word constituted by FLAGS and its redundancy bits constituted by FCS), are distributed over the remaining bits of this set of three fields.

Thus, the bits of the block COM as output at 6 are applied to input 9 of an HDLC interface package 8, and the interface produces the following on respective ones of its three outputs 10, 11, and 12:

acknowledgement ACK on 10;

the other parts of the block COM, except for FCS; and an FCS-OK flag on 12, which indicates whether or not the block COM is properly formed.

So far as the HDLC package 8 is concerned it appears to receive a continuous HDLC frame since it receives a succession of blocks COM each beginning with its FLAGS word constituting its own frame locking word.

This control information output by the HDLC component 8 on its outputs 10, 11, and 12 is applied to respective inputs 13, 14, and 15 of the microprocessor 5, which makes use of them to implement a "go-back-N" ARQ protocol which, in accordance with the invention, satisfies the following special additional rules:

when an acknowledgement is not received correctly, after a preceding acknowledgement that was received correctly, then the incorrectly received acknowledgement is assumed to be positive, as are the following (N−1) acknowledgements if they too are received incorrectly, but under such circumstances, if the Nth acknowledgement is still incorrectly received, it is assumed to be negative and the N blocks relating to this series of N incorrectly received acknowledgements are then repeated;

when the receiver receives a repeat request, it does not take it into account if the requested block has been requested less than N turns previously; and when the receiver requests the same block several times in succession up to N times, only the first request is taken into account.

Thus, if a prolonged period of fading occurs or if an intelligent jammer jams both deliberately and well, then the acknowledgement ACK will not be correctly received by one of the two parties on N successive occasions, whereupon the party that has not received an acknowledgement for N successive occasions assumes the worse and automatically retransmits starting from the first block for which it has not received a positive acknowledgement, followed by all the others.

The blocks INFO output at 7 from the decoder 2 are applied at 16 to a buffer memory 17 which has an input 18 connected to the controlling microprocessor 5 via which it receives a useful block extraction signal, which blocks constitute the received information and are output at 19.

Since the link is a duplex link, i.e. a two-way link, the data train to be transmitted by the same party arrives at 20 for storage in a buffer memory 21. Depending on the information contained in the block COM received from the other party, the microprocessor 5 uses link 22 to specify which information is to be transmitted from the memory 21 (or retransmitted therefrom), and this information is naturally associated with a new block COM generated by the microprocessor in accordance with the ARQ protocol for reception by the other party.

The corresponding frames are then applied at 23 to an error-correcting encoder 24 in the installation shown, which encodes the blocks COM and the blocks INFO in a conventional manner, and the digital data to be transmitted is output together with corresponding frame locking words MVT to the radio portion of the transmitter. Naturally, the invention is not limited to the embodiment described above, and may be implemented in numerous other ways.

We claim:

1. A method of automatically requesting retransmission of a badly received message, for use in a duplex digital transmission installation having at least one return channel, the method making use of a go-back-N ARQ type protocol, i.e. an automatic repeat request protocol in which packets of symbols are transmitted on a continuous basis, and responses from a receiver arrive after a certain time delay equal to the time taken by a transmitter to transmit (N−1) other packets, the method being characterized in that the protocol is based on the conventional go-back-N ARQ rules together with at least the following following additional rule:

when a particular acknowledgement is not received correctly, after a preceding acknowledgement that was received correctly, then the incorrectly received particular acknowledgement is always assumed to be positive, after any of the following (N−1) acknowledgements are correctly received, with any acknowledgements immediately following said particular acknowledgement also always being assumed to be positive if they too are received incorrectly as long as any of the (N−1) acknowledgements immediately following said particular acknowledgement are correctly received, but if an Nth consecutive acknowledgement is incorrectly received, said particular acknowledgement is assumed to be negative and the N blocks relating to this series of N incorrectly received acknowledgements are then repeated.

2. A method of automatically requesting retransmission according to claim 1, characterized in that the the protocol further includes the following two additional rules:

when the receives a transmitter receives a repeat request, it does not take it into account if the requested block has been requested less than N turns previously; and when the receiver requests the same block several times in succession up to N times, only the first request is taken into account.

3. A method according to claim 1, characterized in that in order to make use of an HDLC component on reception, the bits in conventional ADDRESS, CONTROL, and INFO-COM fields of a conventional HDLC frame are used as follows for a command block in a transmitted frame, which command block contains all of the information required for implementing the ARQ protocol:

the positive or negative acknowledgement constitutes the first bit of the ADDRESS field; and the other items in the command block, apart from its own frame locking word and its redundancy bits, are distributed over the remaining bits in said ADDRESS, CONTROL, and INFO-COM fields.

4. A duplex digital transmission installation implementing the method of claim 3, characterized in that for each party it includes at least:

a decoding circuit for detecting or correcting errors in the received signal, having an output for a decoding reliability flag signal, an output for a decoded command block, and an output for an information block containing the useful bits of decoded information;

a controlling microprocessor;

an HDLC component receiving the decoded command block on its input and having its outputs applied to the controlling microprocessor;

a buffer memory which stores said received decoded information blocks and from which a useful received data train is extracted under the control of the microprocessor; and another buffer memory which stores data trains for transmitting under the control of the microprocessor, and which includes a transmission output for said data trains.

5. A duplex digital transmission installation for automatically requesting retransmission of a badly received message, said duplex digital transmission installation being for one of a plurality of parties and having at least one return channel, said duplex digital transmission installation comprising:

- a decoding circuit for detecting or correcting errors in a received signal, said decoding circuit outputting a decoding reliability flag signal, a decoded command block, and an information block containing the useful bits of decoded information;
- an HDLC component receiving the decoded command block and outputting an acknowledgement signal and repeat request information;
- a microprocessor for controlling the retransmission of data based on the decoding reliability flag, the acknowledgement signal and the repeat request information, wherein said microprocessor operates according to a go-back-N ARQ type protocol modified in that: when a particular acknowledgement is not received correctly, after a preceding acknowledgement that was received correctly, then the incorrectly received particular acknowledgement is always assumed to be positive after an of the following (N−1) acknowledgements are correctly received, with any acknowledgements immediately following said particular acknowledgement also always being assumed to be positive if they too are received incorrectly as long as any of the (N−1) acknowledgements immediately following said particular acknowledgement are correctly received, but if an Nth consecutive acknowledgement is incorrectly received, said particular acknowledgement is assumed to be negative and the N blocks relating to this series of N incorrectly received acknowledgements are then repeated;
- a first buffer memory for storing the information blocks and from which a useful received data train is extracted under the control of said microprocessor; and
- a second buffer memory which stores a data train for transmitting under the control of said microprocessor.

6. A duplex digital transmission installation according to claim 5, wherein said duplex digital transmission installation is a duplex telephone transmitter/receiver installation.

* * * * *